US012644312B2

(12) United States Patent
Caterino et al.

(10) Patent No.: US 12,644,312 B2
(45) Date of Patent: Jun. 2, 2026

(54) CLUTCH FOR A LOCK

(71) Applicant: ASSA ABLOY Residential Group, Inc., New Haven, CT (US)

(72) Inventors: Mark Caterino, Prospect, CT (US); Vu Nguyen, Farmington, CT (US); Wai P. Wong, Orange, CT (US)

(73) Assignee: ASSA ABLOY Residential Group, Inc., New Haven, CT (US)

( * ) Notice: Subject to any disclaimer, the term of this patent is extended or adjusted under 35 U.S.C. 154(b) by 142 days.

(21) Appl. No.: 18/198,453

(22) Filed: May 17, 2023

(65) Prior Publication Data

US 2024/0218704 A1 Jul. 4, 2024

Related U.S. Application Data

(60) Provisional application No. 63/437,043, filed on Jan. 4, 2023.

(51) Int. Cl.
*E05B 47/06* (2006.01)
*E05B 63/00* (2006.01)

(52) U.S. Cl.
CPC ........ *E05B 47/068* (2013.01); *E05B 63/0017* (2013.01)

(58) Field of Classification Search
CPC .... E05B 47/00; E05B 47/068; E05B 63/0017; E05B 47/0012; E05B 2047/002; E05B 2047/0091; E05B 2047/0031
USPC ................................................ 70/277, 278.3
See application file for complete search history.

(56) References Cited

U.S. PATENT DOCUMENTS

| | | | | |
|---|---|---|---|---|
| 3,154,302 | A | 10/1964 | Maruyama | |
| 3,939,679 | A * | 2/1976 | Barker | F41A 17/063 341/181 |
| 4,573,723 | A | 3/1986 | Morita | |
| 4,961,584 | A | 10/1990 | Day, Sr. | |
| 6,845,642 | B2 * | 1/2005 | Imedio Ocana | E05B 47/068 70/222 |
| 7,543,469 | B1 * | 6/2009 | Tseng | E05B 47/068 292/144 |
| 7,966,854 | B2 * | 6/2011 | Imedio Ocana | E05B 47/0642 192/69.62 |
| 8,141,400 | B2 | 3/2012 | Sorensen | |
| 8,516,865 | B2 * | 8/2013 | Ferreira Sanchez | E05B 47/0012 70/472 |
| 2003/0150248 | A1 * | 8/2003 | Wu | E05B 55/005 70/224 |
| 2010/0294008 | A1 * | 11/2010 | Bogdanov | E05B 63/0017 70/277 |
| 2017/0037937 | A1 | 2/2017 | Ku | |

(Continued)

FOREIGN PATENT DOCUMENTS

| | | |
|---|---|---|
| KR | 0118627 | 3/1998 |
| KR | 2004028317 | 10/2006 |

*Primary Examiner* — Suzanne L Barrett

(74) *Attorney, Agent, or Firm* — Calfee, Halter & Griswold LLP

(57) ABSTRACT

A lock clutch is provided to selectively couple a knob to a lock. In a locked configuration the clutch decouples the knob from the lock, so that rotating the knob does not operate the lock. In an unlocked configuration, the clutch rotationally connects the knob to the lock such that the lock may be operated by turning the knob. According to some embodiments, the knob may be a thumb turn and the lock may be a deadbolt lock.

20 Claims, 10 Drawing Sheets

(56) References Cited

U.S. PATENT DOCUMENTS

| | | | | |
|---|---|---|---|---|
| 2017/0306652 | A1* | 10/2017 | Guo | E05B 17/045 |
| 2018/0320413 | A1 | 11/2018 | Wong | |

* cited by examiner

CLUTCH FOR A LOCK

CROSS-REFERENCE TO RELATED APPLICATIONS

This application claims the benefit under 35. U.S.C. § 119(e) to U.S. Provisional Application Ser. No. 63/437,043, titled "CLUTCH FOR A LOCK," filed Jan. 4, 2023, which is herein incorporated by reference in its entirety.

FIELD

The present disclosure relates generally to aspects of door locks including deadbolt locks.

BACKGROUND

Deadbolt locks are one type of lock used to secure doors against entry by unauthorized individuals. The deadbolt lock controls the motion of the deadbolt assembly, allowing the bolt to retract only after a user has provided proper credentials and activated the lock. Many deadbolt locks provide a thumb turn which may be manipulated by a user to lock or unlock the deadbolt.

SUMMARY

According to one aspect, a door lock assembly comprises a knob configured to allow a user to lock or unlock a door, and a tailpiece configured to rotate about a longitudinal axis. Rotation of the tailpiece is configured to retract or extend a latch. The door lock assembly further comprises an actuator configured to move in a linear direction parallel to the longitudinal axis, and a mechanical interlocking clutch configured to selectively couple the knob to the tailpiece. The mechanical interlocking clutch is configured to slide in the longitudinal direction in response to a movement of the actuator. In an unlocked configuration the clutch couples the knob to rotate with the tailpiece, and in a locked configuration the clutch uncouples rotation of the knob from the rotation of the tailpiece.

According to another aspect, a door comprises a door including a first face and a second face. With the door closed, the first face is exposed to an unsecured space and the second face is exposed to a secured space. The door additionally includes a bore hole extending between the first face and the second face; and a door lock disposed at least partially within the bore hole. The door lock further comprises a latch configured to prevent the door from opening when the latch is extended, a knob disposed on the first side of the door and configured to extend and retract the latch, a mechanical interlocking clutch configured to selectively couple the knob to the lock; and an actuator configured to move the mechanical interlocking clutch between a coupled position and an uncoupled position. The mechanical interlocking clutch and the actuator are disposed within the bore hole.

According to another aspect, a clutch for a lock assembly comprises a driving plate configured to rotate upon rotation of a knob, a driven plate configured to translate along a longitudinal axis about which the clutch rotates and to engage with the driving plate when translated to abut the driving plate. Each of the driving plate and the driven plate further include a plurality of dogs disposed on the driving plate to face the driven plate and disposed on the driven plate to face the driving plate. The dogs are spaced in a pattern about an axis of rotation of each of the driving plate and the driven plate such that when brought together the dogs on the driving plate enter spaces between dogs on the driven plate and the dogs on the driven plate enter spaces between the dogs on the driving plate. The clutch for a lock assembly additionally comprises an actuator configured to move along an axis parallel to the axis of rotation of the clutch and configured to move the driven plate in and out of engagement with the driving plate. The lock is in an unlocked position when the dogs are brought together and the lock is in a locked position when the dogs are separated.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
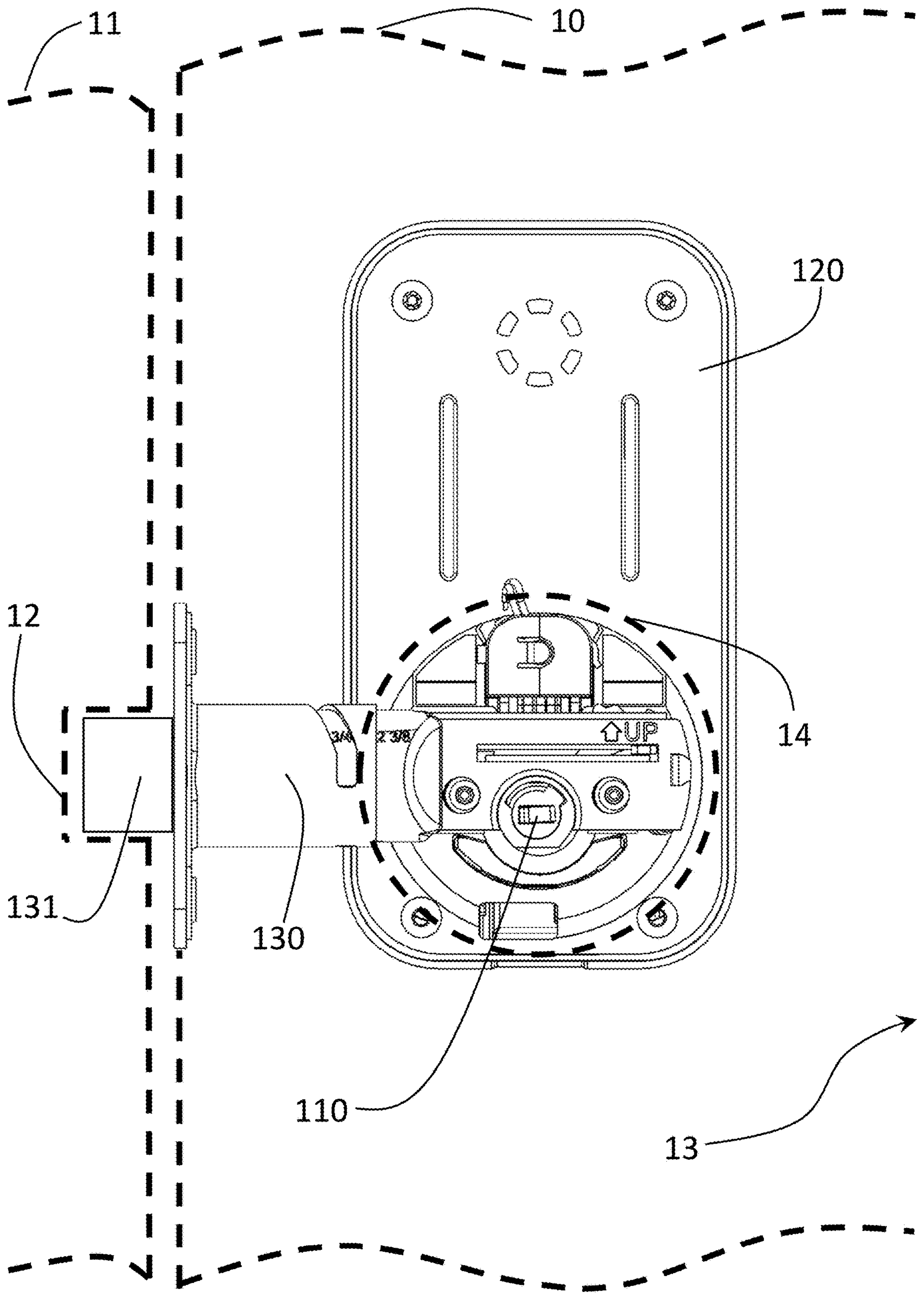
FIG. 1 is an exterior facing view of a lock mounted on a door.

Aspects described herein relate to improvements to door locks (also referred to as locks) that employ deadbolts. Door locks typically include and exterior portion accessible to persons both authorized and unauthorized to enter the locked space; an interior portion accessible only to users within the locked space; and a deadbolt assembly contained within the door. Within the deadbolt assembly, a sliding member (the bolt) can traverse within the deadbolt assembly and extend therefrom so that it may partially enter the door jamb to prevent the door from opening. The exterior portion of the lock assembly may contain key openings, touchpads, or other interface for a user to present a key, passcode, or other credentials to open the door. The interior portion of the lock assembly resides within the locked space when the door is closed and therefore has no guards to prevent unlocking by those already within that space. Thumb turns may be provided on the unsecured interior side for ease of mechanical operation. Thumb turns may also be employed on the secured exterior side, but if this is done, the lock must be constructed to immobilize or disconnect the thumb turn in the locked condition to prevent unauthorized individuals from accessing the space without first requiring the user to unlock the lock. Furthermore, the lock and thumb turn may be designed to avoid the possibility of an intruder overpowering the thumb turn lock to gain entry to the secured space (such as by grasping and turning the thumb turn with a wrench). For instance, in embodiments described herein, a thumb turn may be decoupled from the lock assembly in the locked state such that the thumb turn free-spins (freewheels), when a user attempts to turn the thumb turn. In this manner, the thumb turn is effectively disconnected from the lock.

The Inventors have found that marketplace may find thinner/low profile door locks more desirable than thicker door locks. That is, thinner deadbolt locks have a smaller envelope such that they protrude less far away from and therefore remain closer to the surface of a door than thicker deadbolt locks. Customers may find these thinner locks to be more aesthetically pleasing and may additionally find thinner locks to be less obtrusive to the use of the door.

The Inventors have recognized and appreciated improvements in door locks employing deadbolt assemblies to keep the door lock as low profile as possible while also providing a lock clutch that facilitates decoupling of a knob, such as a thumb turn, from the lock assembly. According to some embodiments, a lock assembly is provided wherein a thumb turn is connected to a lock tailpiece with a sliding and mechanical interlocking clutch disposed therebetween. A tailpiece of a lock serves as a shaft, often of a square or rectangular cross section, the rotation of which actuates the lock such as by actuation the sliding deadbolt or striker. The mechanical interlocking clutch may be engaged or disengaged by a lead screw and motor operating on an axis parallel to that of the rotation of the clutch and tailpiece such that the clutch and clutch actuation may reside within the bore hole of a door when the lock assembly is mounted thereon. It should be appreciated that embodiments of the lock clutches as disclosed herein may be applied to couple/decouple thumb turns from deadbolt lock assemblies; however, other embodiments are contemplated wherein lock clutches may be applied to other types of door locks, such as for coupling/decoupling a door knob or door handle lever to a knob lock or mortice lock.

According to some embodiments, a knob may be selectively coupled to a lock assembly with a mechanically interlocking clutch. As used herein, the term "knob" is referred to as any type of handle, lever, knob, thumb turn or control of any other shape that may be turned by a user to change the position of a latch and/or to open a door. The term "latch", which may include any component that slidably protrudes from door to engage with a door opening for the purpose of keeping a door closed, may be in reference to a door latch or a deadbolt or striker or any other similarly functioning component. A door may be said to be in an unlocked configuration when a user causes the door to open by turning one or more knobs, and/or pushing on levers etc. without entering credentials such as a key, passcode, or biometric marker. A door may be said to be in a locked configuration when a user must supply credentials to open the door.

A mechanical interlocking clutch may comprise a clutch driving plate which is turned by an outside force, such as from a motor or the user, and a clutch driven plate, which is turned by the driving plate when the clutch is engaged. When the clutch is not engaged, the clutch driven plate is mechanically independent of the clutch driving plate and motion will not be transmitted therebetween. A mechanical interlocking clutch is also a positively engaging clutch, meaning the clutch is either engaged so that the driving and driven plates move together, or it is fully disengaged. In contrast, a friction clutch, such as an automobile clutch, may "slip", that is, transmit a torque while still allowing for some relative motion between the driving and driven plates. If a mechanical interlocking clutch selectively couples a thumb turn to a deadbolt lock, for instance, the interlocking clutch may allow the thumb turn to operate the deadbolt lock when the clutch is engaged and it may allow the thumb turn to free-spin when the clutch is disengaged.

According to some embodiments, a clutch connecting a knob, such as a thumb turn, with a door lock assembly may be actuated by a linear drive or linear actuator, the linear actuator being arranged to be parallel with the rotational axis of the clutch and tailpiece, such that the motion of the linear actuator is along a longitudinal axis of the tailpiece. The longitudinal axis of the tailpiece is normal to the outer and inner surfaces of a door. The tailpiece may extend along an axis connecting inside and outside doorknobs, inside and outside thumb turns, or a thumb turn and a key cylinder in some embodiments. A linear actuator may include an electric motor and a lead screw. A linear actuator with an axis parallel to the tailpiece may include an electric motor with the axis of the armature of the motor running parallel to the tailpiece. A leadscrew may be provided to convert rotational motion of the motor to linear motion along the longitudinal axis of the tailpiece and would therefore be parallel with the tailpiece and also parallel with the axis of the motor armature. In some embodiments the leadscrew may be coaxial with the armature of the motor and may be a separate piece or may form a unitary piece with the armature. In other embodiments, the leadscrew may be parallel with the motor armature and geared thereto.

According to some aspects, a door lock assembly may comprise a mechanical interlocking clutch and clutch actuator that are configured to be disposed within a bore hole of a door. Door locks such as deadbolt locks may be mounted to a door by at least partially inserting the door lock into a bore hole within the door. The axis of the bore hole may be normal to the inner and outer surfaces of a door, and run therebetween at a location where it is desired to mount the lock, parallel or potentially concentric with the tailpiece. Portions of the lock that are disposed within the door bore may or may not protrude past the inner and outer surfaces of the door. If a lock may be entirely within the door bore then that lock may be substantially flush with the door surface excluding any knobs, thumb turns, escutcheon plates, etc. that may be provided for a user to control the lock.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts a deadbolt lock assembly mounted to a door 10. Lock chassis 120 is mounted flush with a surface of door 10, near the opening edge of the door and partially entering bore hole 14. The hinged edge of the door is located in direction 13. Deadbolt 130 is inset into the door and operated by tailpiece 110 (only the end is visible). Bolt 131 is slidably connected to deadbolt assembly 130 such that rotating tailpiece 110 extends or retracts bolt 131. Bolt 131 is illustrated in the extended, locked, position where bolt 131 enters pocket 12 in door jamb 11, preventing the operation of the door while the bolt is extended.

Figure 2A:
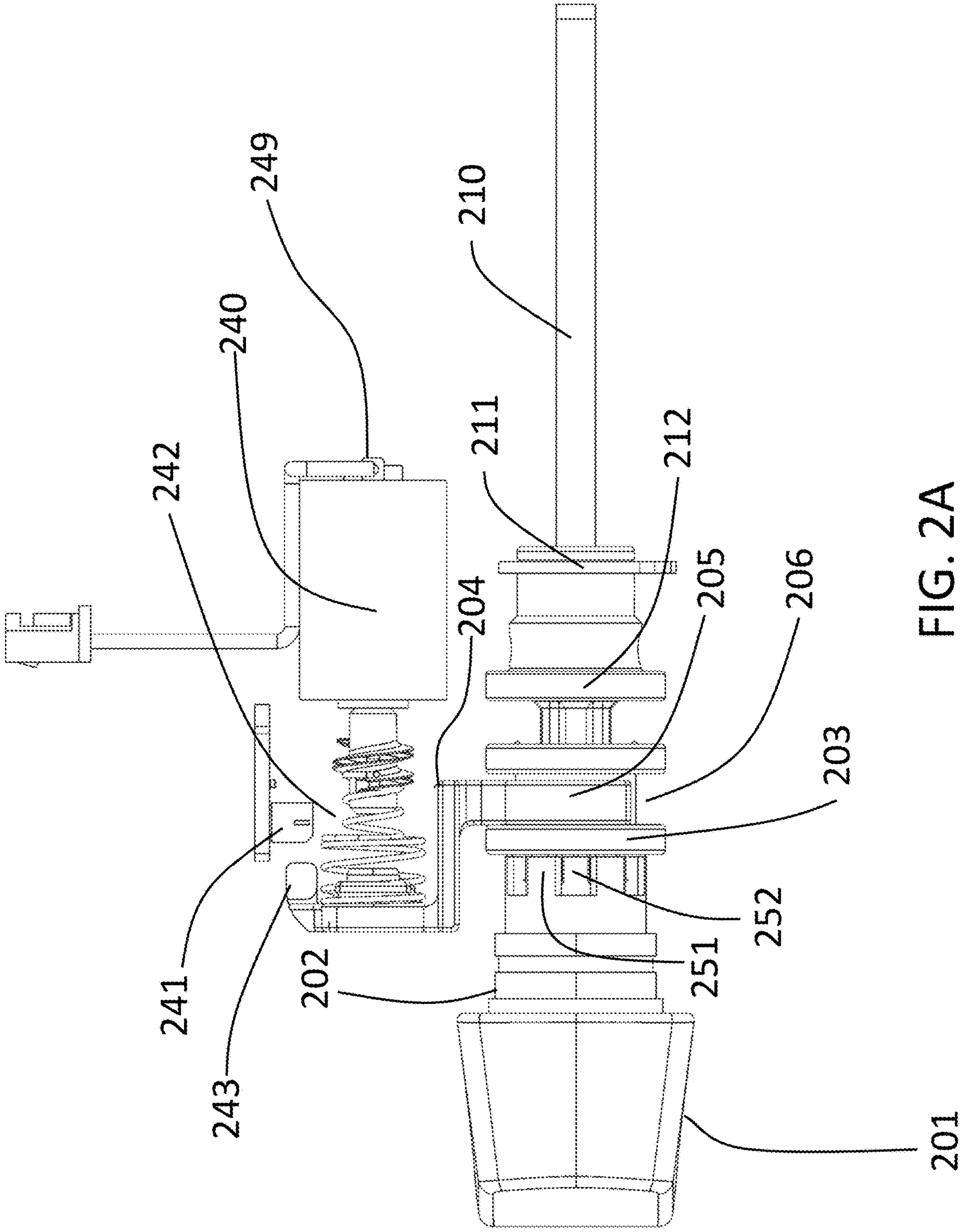
FIG. 2A is a side view of one embodiment of a lock clutch for the door lock shown in an unlocked configuration.

FIG. 2A depicts a side view of one embodiment of a lock clutch applied to a deadbolt lock assembly. In the figure, the supporting framework of the lock is removed for clarity. A thumb turn may be provided on the outside of a door for a user to extend or retract the deadbolt, and a clutch may be provided to decouple the thumb turn on the unsecured side of the door. As illustrated, the lock is unlocked, that is, the thumb turn is connected to operate the deadbolt. Thumb turn 201 is rotatably connected with clutch driving plate 202. Clutch driven plate 203 is coaxial to and in engagement with the clutch driving plate. Dogs on the clutch driving plate 202 are shown engaging with dogs 252 on the clutch driven plate, rotationally connecting the thumb turn with tailpiece 210. The clutch driven plate 203 slides on a square or splined surface of output unit 212, such that output unit 212 allows the driven plate to transmit torque between the driven plate and output unit while still allowing the driven plate to slide a sufficient distance to fully engage and disengage the clutch. The tailpiece 210 is held into the output unit for translation and rotation by snap ring 211. Clutch driver unit 204 slidably positions clutch driven plate 203 connecting the clutch driven plate with the leadscrew 242 of the actuator. In the illustrated embodiment, the actuator comprises motor 240, leadscrew 242 and stop switch 241 to limit travel. The leadscrew itself includes spring 355 and worm 356 (see FIG. 3). Both the leadscrew 242 and armature 249 are arranged to run parallel to tailpiece and may fit inside the door bore hole (not shown in FIG. 2A). Note that armature 249 runs longitudinally through the motor connecting to leadscrew 242 at the thumb turn end of the motor and projecting outward from the motor at the tailpiece end of the motor where it is visible in the figure. The lower portion of the clutch driver unit 204 forms a clutch shifter fork 205 that rides in the groove 206 of the spool shaped portion of driven plate 203, thereby allowing the driver unit to couple or uncouple the clutch plates. As illustrated in FIG. 2A, the deadbolt lock is unlocked, and thus the user may turn thumb turn 201, rotating the tailpiece 210 which in turn actuates a deadbolt, such as deadbolt 130 in FIG. 1, which is actuated by rotation of the corresponding tailpiece 110.

Figure 2B:
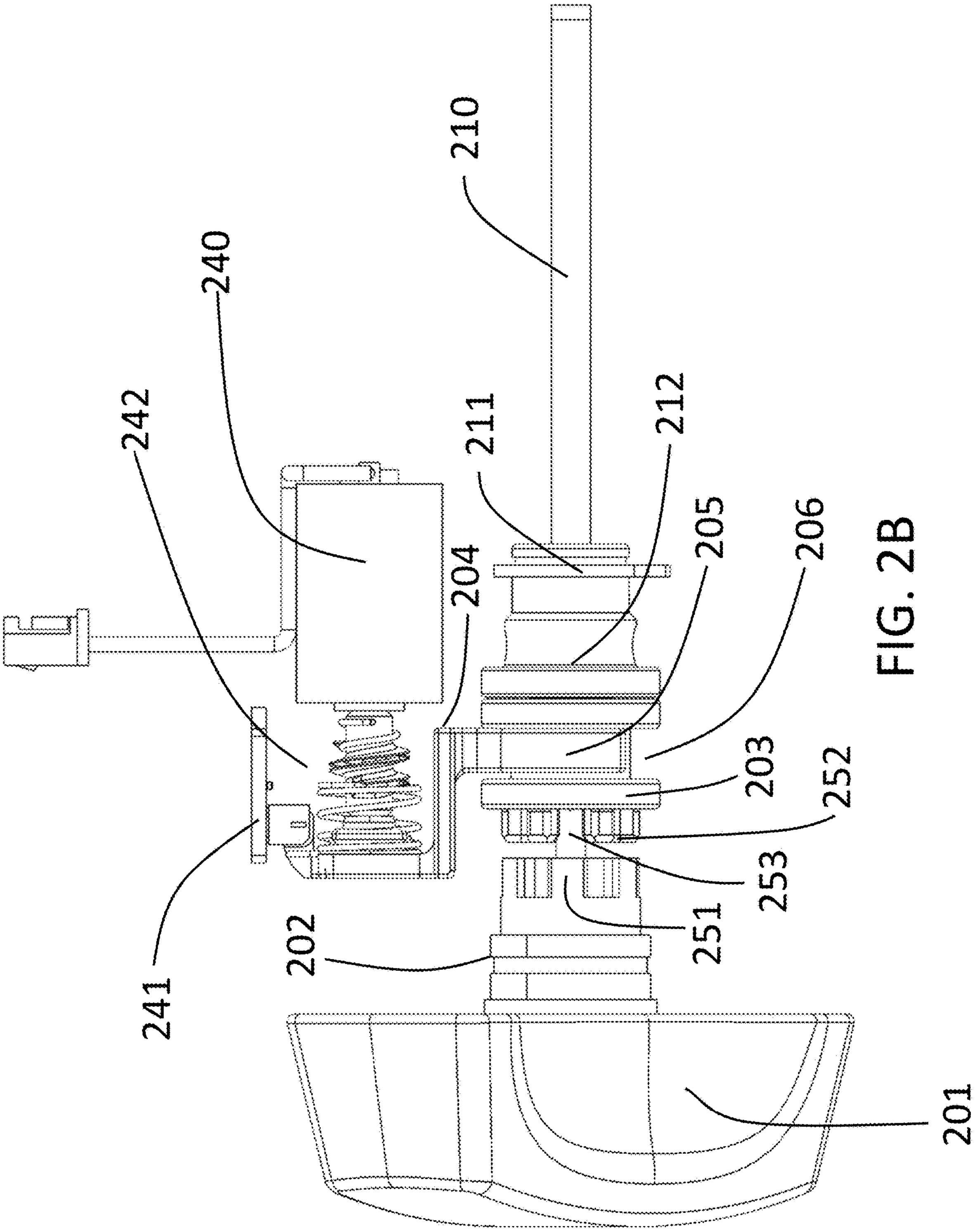
FIG. 2B is a side view of one embodiment of the lock clutch in a locked configuration.

FIG. 2B illustrates the embodiment of FIG. 2A with the mechanical interlocking clutch in the decoupled or locked position. Rotating thumb turn 201 will rotate clutch driving plate 202 but not the clutch driven plate 203 because the dogs 251 on the clutch driving plate 202 are held away from engaging with slots 253 on the driven plate 203. As a result, the thumb turn will not rotate the tailpiece so long as the clutch remains in the disengaged position and the deadbolt will therefore not retract and thus not allow the door to be opened.

In the locked position, the stop 243 which comprises an upper portion of the clutch driver unit 204 contacts stop switch 241 to stop the motion of the motor and leadscrew with the clutch decoupled. When the clutch driver unit 204 moves away from the thumb turn to disengage the clutch driven plate 203 from the clutch driving plate 202, the stop 243 moves toward the stop switch 241. The relative locations of the stop 243, stop switch 241 and clutch shifter fork 205 are such that the stop activates the stop switch when the shifter fork has moved the clutch driven plate completely out of engagement with the clutch driving plate, such that the clutch is fully disengaged and further movement of the clutch driver unit 204 in the direction of the tailpiece is not necessary. The stop switch discontinues motion in the clutch disconnecting direction such as by sending a stop signal to a controller, or by directly disconnecting power from the motor 240.

Together, the clutch driving plate and clutch driven plate form a mechanical interlocking clutch. Each of the driving plate and the driven plate include a plurality of dogs protruding from a face of the respective plate and spaced apart by a distance forming a recess between adjacent dogs. Dogs from one plate may enter the recess of the opposing plate when the clutch plates are engaged. Each dog may have at least one thrust face substantially normal to the direction of rotation of the clutch plate and configured to transmit force to a thrust face of an opposing dog on an opposing plate. The clutch plate with dogs and recesses forms a castellated structure. The dogs disposed on the clutch driving plate 252 face the dogs on the clutch driven plate 251. The dogs are spaced in a pattern about the axis of rotation of each of the driving plate and the driven plate to create the recesses, such as recess 253, that a dog from the opposing plate may enter when the plates are brought together. For instance, when brought together, the dogs of the clutch driving plate enter spaces between dogs on the clutch driven plate and the dogs on the clutch driven plate enter spaces between the dogs on the clutch driving plate. When so engaged, forces may be transmitted between the thrust faces of the dogs and the clutch may transmit a rotational torque independent of the friction between the plates or the normal forces pressing those plates together in an axial direction. When the clutch is disengaged, the dogs of one plate are outside of the recesses of the other plate and either plate may spin without imparting motion to the other plate.

Figure 3:
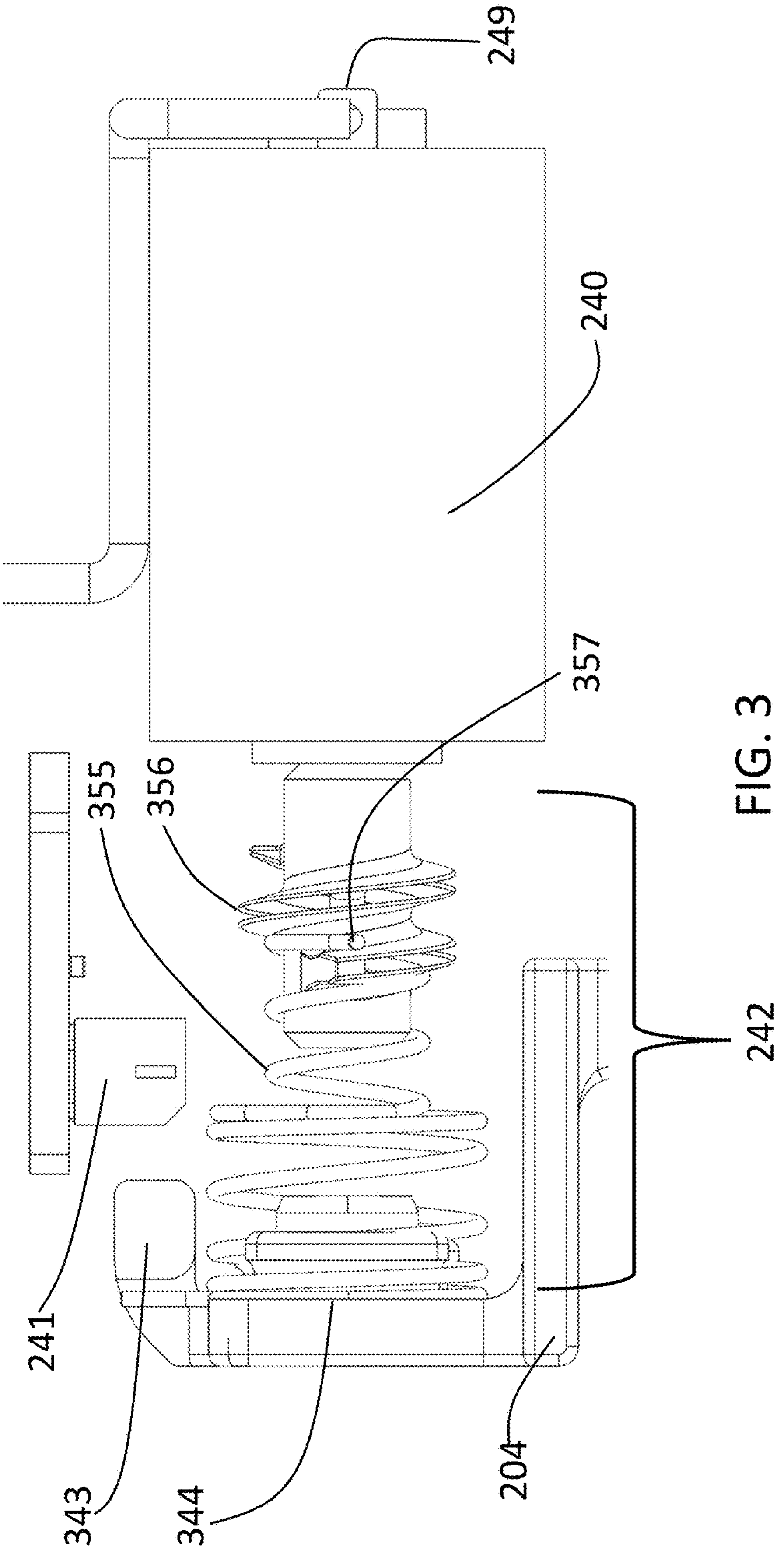
FIG. 3 is a view of a clutch actuator in the embodiment of FIGS. 2A and 2B.

FIG. 3 Shows a close-up view of the leadscrew of the embodiment in FIGS. 2A and 2B. Motor 240 is coupled to clutch driver unit 204 by leadscrew 242 and configured so that the leadscrew may impart sliding motion to the clutch driver unit along a direction parallel to the longitudinal axis of the leadscrew. According to the illustrated embodiment, as noted above, the leadscrew comprises a helical spring 355 and a helical worm 356. The worm is mounted on the thumb turn facing end of the motor armature shaft 249 and includes helical flutes configured to match the pitch of the spring 355 such that rotation of the motor may engage the worm with the spring so that the spring moves along a longitudinal axis parallel with the axis of the motor armature. The spring 355 is captured by the clutch driver unit 204 at the spring seat 344, at the end of the spring opposite the motor. At the motor/worm end, the spring is supported against rotation with the worm by a tail 357 which slidably engages with a slot in a housing (not shown) that runs longitudinal to the leadscrew. The housing (also not shown) supports the motor and leadscrew. Stop 343 on the clutch driver unit engages with stop switch 241 at the extent of the declutched motion when the lock is in the locked position. In the unlocked position, the travel of the clutch driver unit is limited by the engagement of the clutch plates at which point further rotation of the worm may disengage the end of the spring tail 357 from the worm. On reversing direction, the worm would again engage with the spring pulling the clutch driver unit in the direction of the motor and disengaging the interlocking clutch plates.

Figure 4:
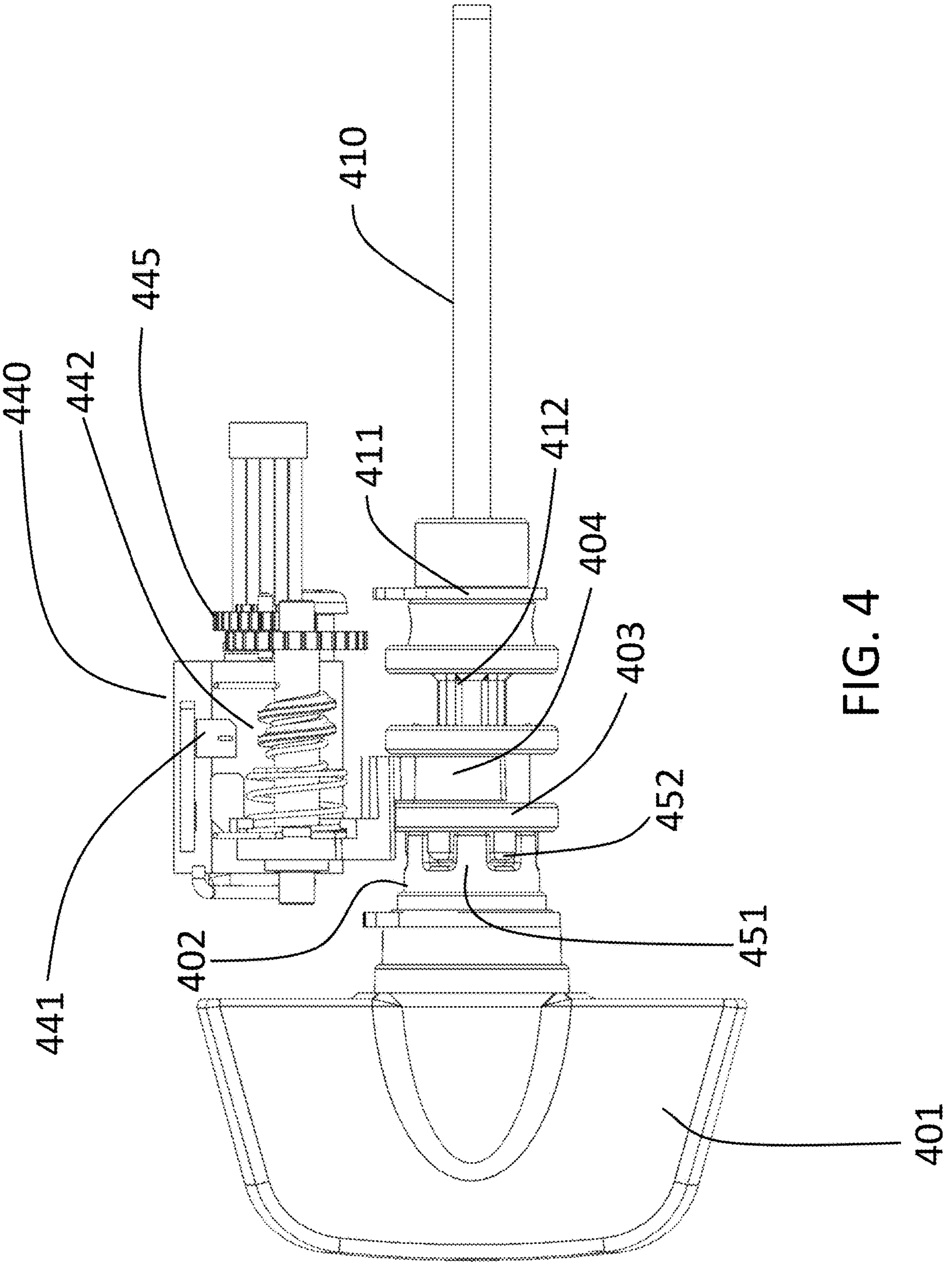
FIG. 4 is a side view of another embodiment of a lock clutch in an unlocked configuration.

FIG. 4 depicts another embodiment of a lock clutch as may be applied to a deadbolt lock assembly. A knob such as thumb turn 401, may be located on the exterior/unsecured side of a door and is connected with a clutch driving plate 402. Clutch driven plate 403 may slidably engage with the clutch driving plate 402, driving dogs 451 and driven dogs 452 on the driving and driven plates respectively. As illustrated, the lock clutch is in the unlocked position wherein a user may rotate thumb turn 401 which in turn rotates tailpiece 410 which may operate a deadbolt, such as deadbolt 130 in FIG. 1. Clutch driven plate 403 is configured to slide longitudinally along a square or splined portion of the output unit 412 as positioned by the clutch driving unit 404. Tailpiece 410 is connected to output unit 412 by snap ring 411. The clutch driving unit is controlled by a linear actuator comprising a motor 440, leadscrew 442 connected by gear train 445. Stop switch 441 indicates when the clutch driving unit has reached the extent of its travel in the decoupling direction. As in the previously described embodiments, the armature of the motor, the leadscrew, and the tailpiece are parallel and configured to be disposed within the bore hole of a door. In this regard, the armature of the motor, the leadscrew and the tailpiece are sized and shaped such that together they fit within the envelope defined by the bore hole.

Figure 5:
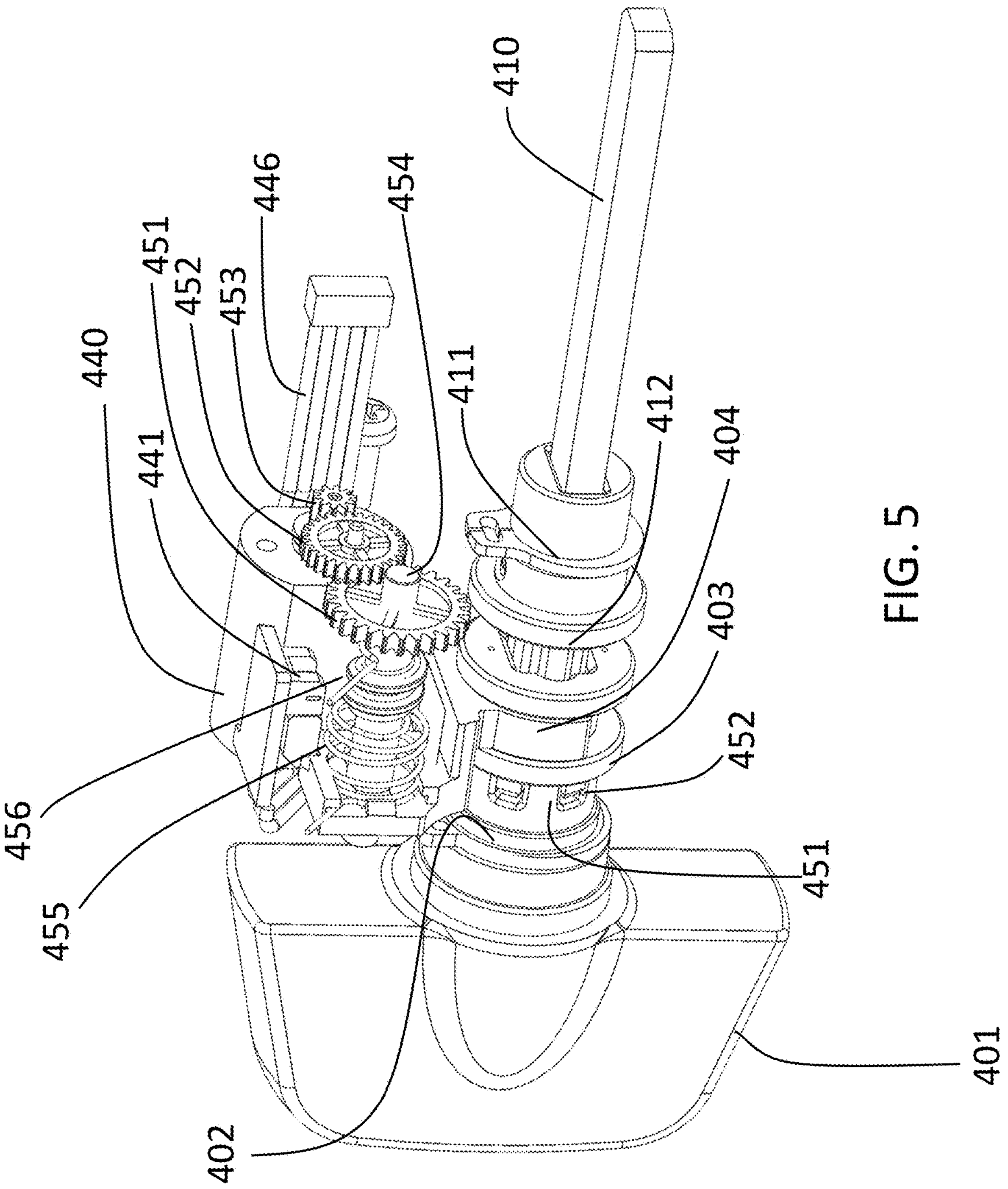
FIG. 5 is an exterior facing perspective view of the embodiment in FIG. 4.

FIG. 5 shows an outward facing perspective view of the embodiment of a lock clutch as illustrated in FIG. 4 and showing more detail of the clutch linear actuator. Leadscrew (442 in FIG. 4) comprises a shaft 454, a worm 456 mounted to the shaft and spring 455, connected to the clutch driving unit at the thumb turn end of spring 455. Tails on both ends of spring 455 engage with a housing (not shown) to oppose rotational motion in the spring. Shaft 454 is coupled to motor 440 by a gear train including a pinion gear 453 attached to the armature shaft of the motor, intermediate gear 452 engaging with the pinion 451 and including its own intermediate pinion (not visible) which engages with driving gear 451 attached to shaft 454. As illustrated, the gear train reduces the speed of the motor and increases motor torque for driving the leadscrew. As with the embodiment shown in FIG. 3, the worm includes helical flutes configured to engage with spring 455 which are configured to thread onto the worm in the manner of a screw and thereby driving spring 455 in a direction longitudinal to the axis of shaft 454. The thumb turn end of spring 455 is held in the clutch driving unit such that the clutch driving unit and the clutch driven plate translate substantially with the motion of the spring when the latter is threaded over the worm. Motor 440 may be electrically connected to a power source and control electronics (not shown) by wiring harness 446.

Figure 6:
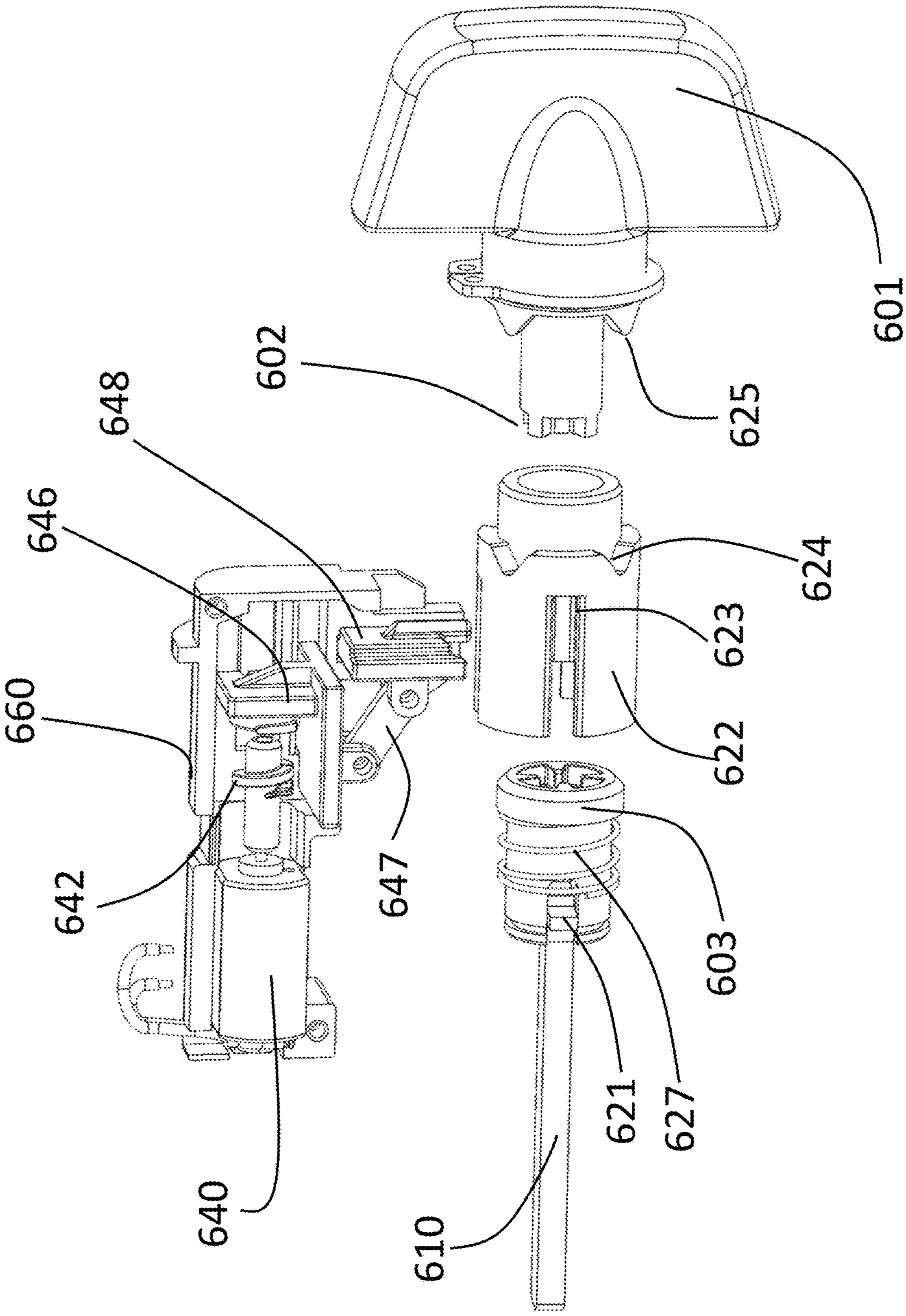
FIG. 6 is an exploded perspective view of another embodiment of a lock clutch.
Figure 7:
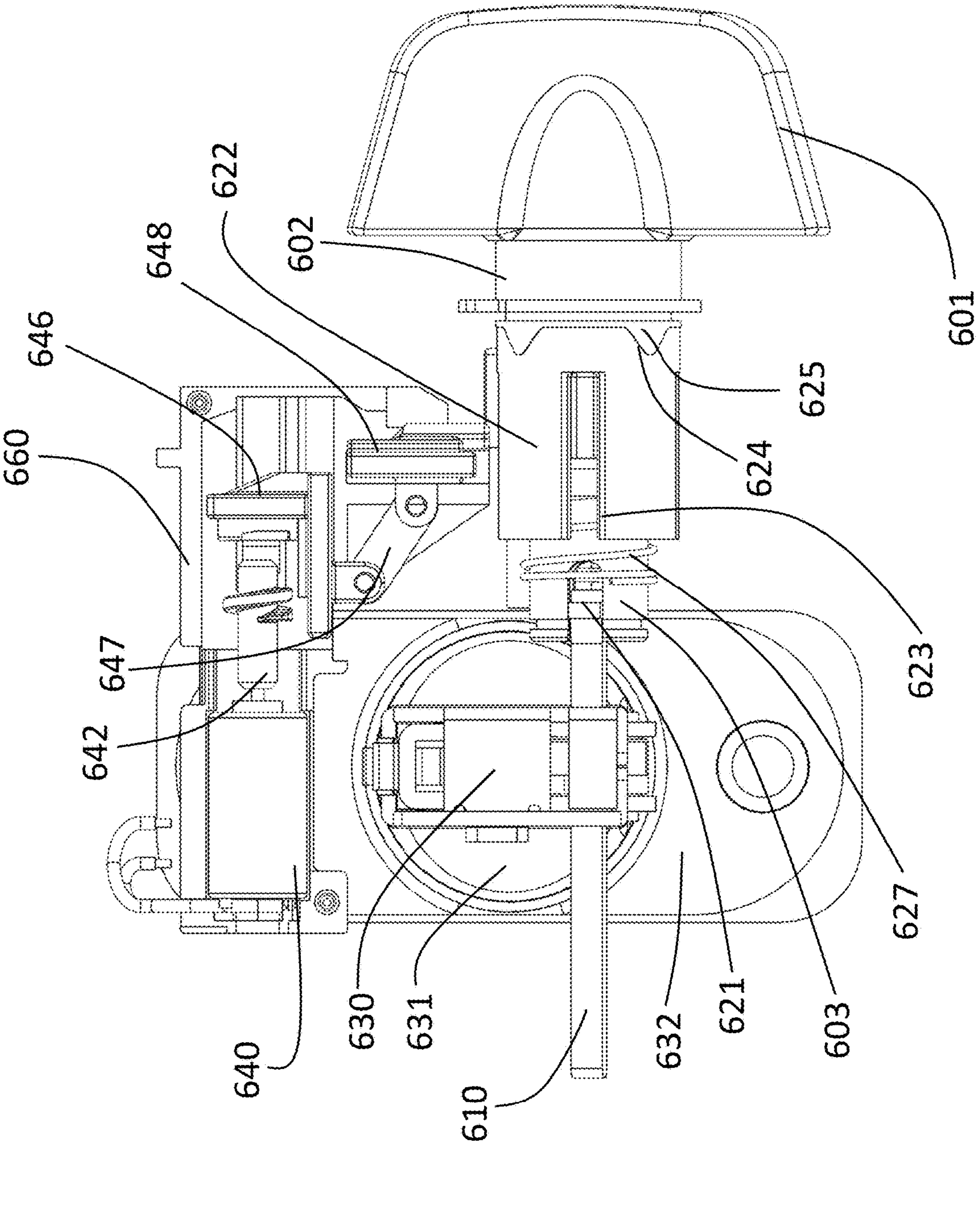
FIG. 7 is a side view of the embodiment of the lock clutch of FIG. 6 in the unlocked configuration.
Figure 8A:
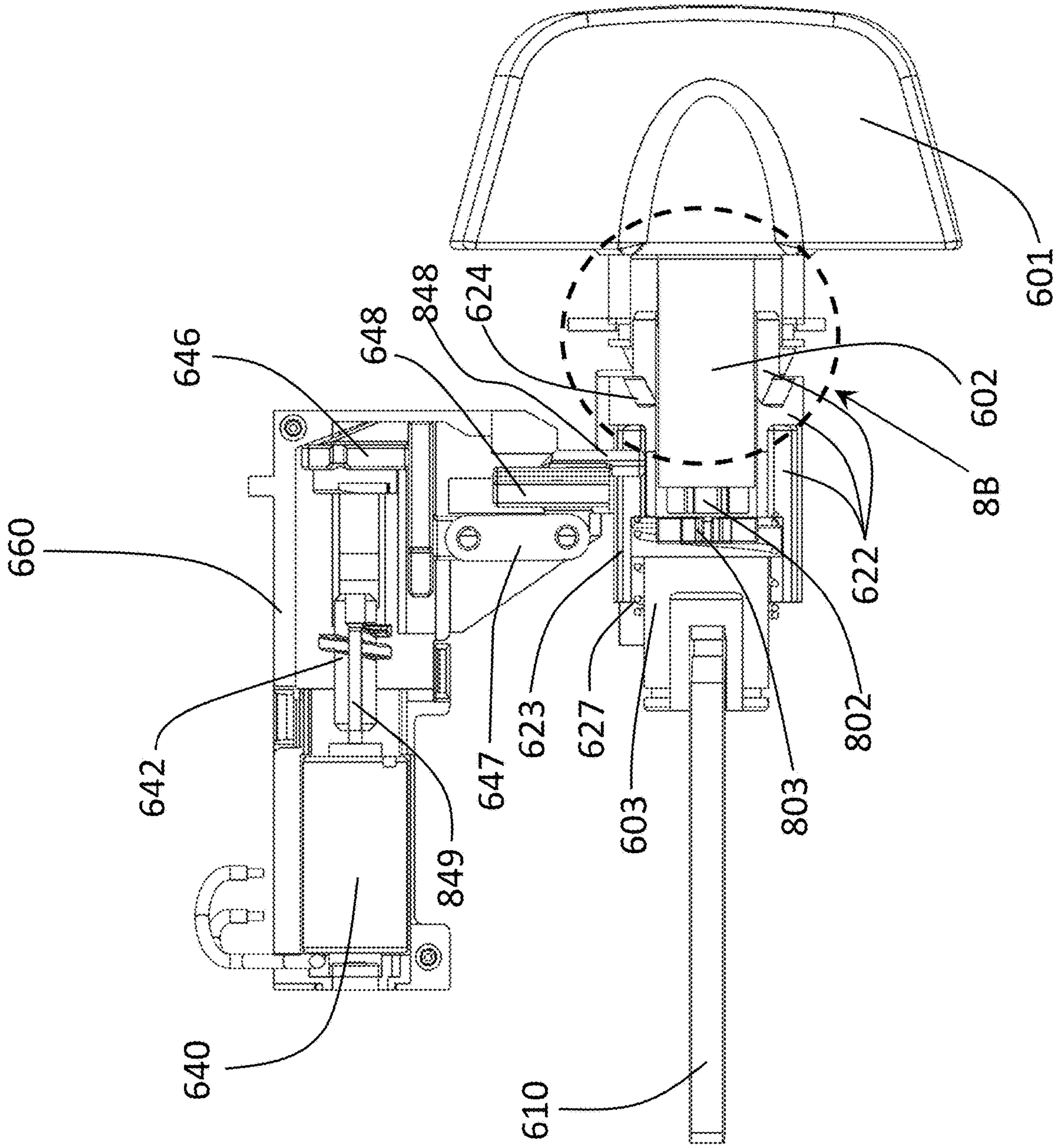
FIG. 8A is a sectional side view of the lock clutch of FIGS. 6 and 7 shown in the locked configuration.

FIGS. 6-8 depict an alternative embodiment of the lock clutch as may be applied to a deadbolt lock. FIG. 6 illustrates an exploded view of the alternative embodiment. Thumb turn 601 is selectively coupled to tail piece 610 through a mechanical interlocking clutch. In the present embodiment, clutch driven plate 603 is biased toward the clutch driving plate 602 by spring 627. The clutch driving plate 602 is rotationally connected to thumb turn 601. The clutch may be decoupled, such as to put the lock assembly in a "locked" configuration by clutch disconnector 622. Clutch disconnector 622 is configured to slidably engage with clutch driven plate 603 and to limit the travel of the driven plate by a shoulder within the clutch disconnector. The clutch disconnector may rotate with the clutch driven plate and tailpiece. For instance, in an unlocked configuration, the clutch disconnector may rotate with the combination of the clutch driven and driving plates which would be in mesh inside of the clutch disconnector 622. In a locked configuration, blocker 648 engages with one of slots 623 in the clutch disconnector 622, preventing the clutch disconnector from rotating but allowing it to slide in the direction of the slots, longitudinal to the tailpiece. Clutch disconnector 622 may be driven longitudinally toward the tailpiece (and away from the thumb turn) by the interaction of cams 625 located on one of the thumb turn or the clutch driving plate with cam surfaces 624 located near the thumb turn end of the clutch disconnector 622. In the locked configuration, movement of the thumb turn will produce a relative rotational motion between cam 625 and cam surface 624 as cam surface 624 is locked from rotation by blocker 648 resulting in longitudinal motion of the clutch disconnector. The disconnector in turn pushes the clutch driven plate 603 away from the thumb turn, disconnecting the driven plate from the driving plate 602 and thereby preventing the thumb turn from actuating the lock. The blocker 648 is driven by a linear actuator comprising motor 640, leadscrew 642, and slider 646. Rotation of the motor rotates the leadscrew parallel with and attached to the motor armature, driving the slider along a track included in housing 660 in a direction parallel with the tailpiece. Linkage 647 converts horizontal linear motion to vertical motion of the blocker 648. Housing 660 including the linear drive and motor is configured to be disposed within the bore hole of a door, as in the previously described embodiments.

FIG. 7 depicts a deadbolt lock including the lock clutch as illustrated in FIG. 6, viewed from the side as viewed in the direction of a door jamb. Tailpiece 610 is shown connected with deadbolt 630 driving bolt 631. Deadbolt escutcheon 632 is configured to be inset within an edge of a door. The lock clutch including the motor and actuator are configured to fit within the bore hole of a door (not shown in this view), as described above with respect to the other embodiments. As pictured, the lock assembly is in the unlocked configuration with blocker 648 retracted upward and the slider 646 positioned toward motor 640 with linkage 647 at an angle to the vertical. Cam 625 is engaged with cam surface 624. The clutch driving and driven plates are engaged although not visible within clutch disconnector 622. The thumb turn, clutch plates and clutch disconnector are free to rotate as a unit, also rotating the tailpiece 610 rotationally connected to the clutch driven plate 603 by engagement of key 621 with a slot. Rotation of tailpiece 610 extends or retracts bolt 631 in deadbolt 330. As previously noted, the lock assembly is in the unlocked configuration, meaning the thumb turn is free to actuate the deadbolt, the deadbolt itself may be in either of the extended or retracted positions such that the lock assembly being in the unlocked configuration does not mean that the door is free to open and may require turning the thumb turn to do so.

Figure 8B:
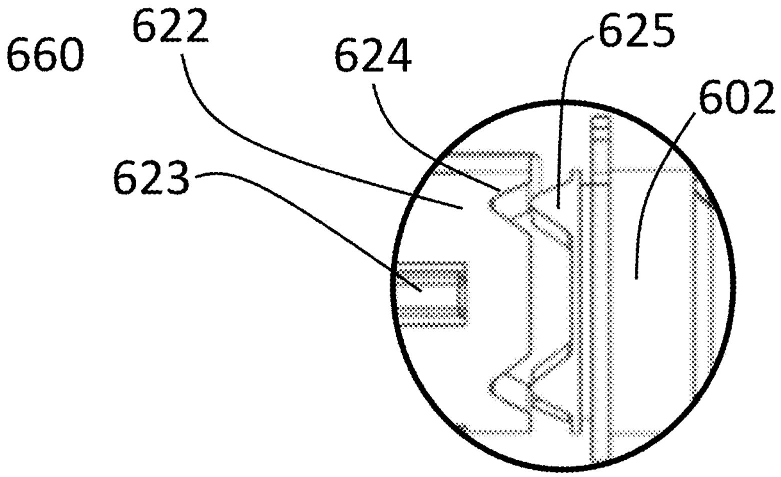
FIG. 8B is an enlarged view of the area encircled by line 8B of FIG. 8A.

FIG. 8 shows a section view of the lock clutch of FIGS. 6-7, here depicted in the locked position. Slider 646 is located toward the thumb turn end of housing 660 with linkage 647 in a vertical position pushing blocker 648 against clutch disconnector 622 such that finger 848 on blocker 648 enters one of slots 623 in the clutch disconnector 622, locking the disconnector from rotation while permitting longitudinal motion. The section view shows clutch driving plate 602 including dogs 802 to be disengaged from clutch driven plate 603 including dogs 803. Clutch separation is apparent in the gap visible between dogs 802 and 803, as shown in FIG. 8B. The clutch driven plate 603 is pushed in the direction of the tailpiece by the clutch disconnector 622, itself pushed in the direction of the tailpiece through the relative motion of cams 625 and cam surface 624 visible in the enlarged view of FIG. 8B. As with the previous embodiments, the thumb turn is rotationally disconnected from the tailpiece in the locked configuration.

Some embodiments described may utilize an electric motor and a leadscrew as a linear actuator to move the clutch plates in and out of mesh. Embodiments are contemplated where solenoid linear actuators may be used to position a clutch actuator. For instance, the embodiments of FIGS. 2A and 2B or of FIGS. 4 and 5, or of FIGS. 6-8 may replace the motor and leadscrew linear actuator with a solenoid linear actuator. The solenoid may move in the longitudinal direction, normal to the face of the door and along an axis parallel with the tailpiece of the lock, replacing the motor and leadscrew but retaining the components driven by the leadscrew. Solenoid linear actuators may include detents to hold the actuator in a specific position without energizing the solenoid. The solenoid linear actuator may include a return spring to bias the actuator in a certain direction, such as to require the solenoid to be energized to engage the clutch and to have the clutch plates otherwise disengaged, such as if power is lost to the solenoid. The solenoid linear actuator may be configured to be disposed within the bore hole of a door.

While some embodiments described are applied to deadbolt lock assemblies with thumb turns, the lock clutch may be applied to other types of lock assemblies or to deadbolt lock assemblies not including thumb turns. For instance, a clutch may be applied to the handle or door knob of a knob or striker type lock so as to allow the door handle to free-spin (freewheel). In knob or handle type locks, such as ordinary door knob locks, the striker latch may be biased or spring loaded to the extended position such that it may be necessary for a user to maintain force on a door knob or door handle to hold the striker latch in a retracted position such as while opening the door from the door jamb. Aspects may be used in cartridge locks or mortise locks. Other embodiments may be applied to locks for other applications, such as cabinets or cupboards, safes, lockers, storage boxes, vehicles, or to access equipment such as electrical cabinets. This disclosure is not intended to be so limiting to the type of lock assembly, application, or to the type of handle, knob, or thumb turn to which the clutch may be applied.

While some embodiments disclose include electrically operated linear actuators configured to be disposed within the bore hole of a door, other methods of actuation are contemplated. For instance, a lock clutch may be actuated by the manual movement of a button, slide, or lever, such as may be included on a secured side of a door for a user to set manually, such as to lock or unlock a door from the interior of a room or apartment. As used herein, "manual" or "manual actuation" refers to an operation wherein the actuation force that may produce actuation movement is provided by physical interaction with a user such as by a user's hand pushing, pulling, rotating etc. or other tactile user input. In some embodiments, the slide may take the form of a button passing through the axis of rotation of a door knob or thumb turn, the button being connected to a clutch driven plate by a clutch driver. In other embodiments, a slider may be used to connect and disconnect the clutch. Other embodiments are contemplated where a mechanical actuator may include a key cylinder configured to be located on the secured side of the door to control the longitudinal movement of the clutch plates. In some embodiments, a key cylinder or handle may be attached to a leadscrew, such as any of the leadscrews previously described, allowing a user to manually operate the clutch by rotation of the key cylinder or handle. Manually actuated embodiments may be configured to dispose the clutch actuator within the bore hole of a door as with the electrically actuated embodiments previously described.

Components of the lock clutch may be formed from plastics, polymer matrix composites, copper alloys including brass and bronze, zinc alloys, aluminum alloys, magnesium alloys, ferrous alloys, or other suitable materials according to some embodiments. Components may be molded, such as by injection molding, cast, die cast, stamped, welded, or formed by any appropriate process or combination of processes. Components may be painted, plated, or coated for decoration or function such as to resist corrosion or to reduce friction.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Further, some actions are described as taken by a "user". It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A door lock assembly, comprising:
- a knob configured to allow a user to lock or unlock a door;
- a clutch driving plate rotationally secured to the knob;
- a tailpiece configured to rotate about a longitudinal axis, wherein rotation of the tailpiece is configured to retract or extend a latch;
- a clutch driven plate rotationally secured to the tailpiece; and
- an actuator comprising:
  - a motor including an output shaft shaft configured to rotate about a first axis parallel to the longitudinal axis;
  - a first helical element mounted to the output shaft for motor driven rotation about the first axis; and a clutch driver unit including a first end portion axially secured to the clutch driven plate and a second end portion aligned with the first axis and including a second helical element threadably engageable with the first helical element for motor driven axial movement of the clutch driver unit and the clutch driven plate between an unlocked configuration in which the clutch driven plate is coupled with the clutch driving plate for co-rotation of the knob and the tailpiece and a locked configuration in which the clutch driven plate is uncoupled from the clutch driving plate to prevent co-rotation of the knob and the tailpiece.

2. The door lock assembly of claim 1, wherein the knob is a thumb turn.

3. The door lock assembly of claim 1, further comprising a deadbolt latch assembly including the latch.

4. The door lock assembly of claim 1, wherein the mechanical interlocking clutch and the actuator are configured to be disposed within a bore hole of a door.

5. A door comprising:

a door panel including a first face and a second face, wherein, with the door closed, the first face is exposed to an unsecured space and the second face is exposed to a secured space, the door panel including a circular bore hole extending between the first face and the second face; and a door lock comprising:

a chassis mounted to the first face of the door panel, covering the circular bore hole and disposed at least partially within the circular bore hole;

a latch configured to prevent the door from opening when the latch is extended;

a knob disposed on the first side of the door and configured to extend and retract the latch;

a mechanical interlocking clutch configured to selectively couple the knob to the lock;

an actuator configured to move the mechanical interlocking clutch between a coupled position and an uncoupled position, and wherein the mechanical interlocking clutch and the actuator are disposed within the circular bore hole.

6. The door of claim 5, wherein the mechanical interlocking clutch rotates about a first axis and wherein the actuator moves along a line defining a second axis and wherein the first axis is parallel with the second axis.

7. The door of claim 5, further comprising a clutch disconnector disposed between the knob and the mechanical interlocking clutch, the clutch disconnector configured to move the mechanical interlocking clutch into an uncoupled position when the knob is rotated while the lock is in a locked configuration.

8. The door of claim 5, wherein a portion of the actuator extends into the secured space, the portion of the actuator configured to couple or uncouple the mechanical interlocking clutch in response to a tactile input from a user.

9. The door of claim 5, wherein the latch is a striker latch and wherein a user must maintain force on the knob to hold the latch in a retracted position.

10. The door of claim 5, wherein the door lock is a deadbolt door lock, the latch is a deadbolt and the knob is a thumb turn.

11. The door lock assembly of claim 1, wherein the first helical element comprises a worm gear.

12. The door lock assembly of claim 1, wherein the second helical element comprises a helical spring.

13. The door lock assembly of claim 1, further comprising a stop switch connected with the motor, wherein when the clutch driver unit is moved to the locked configuration, the clutch driver unit engages the stop switch to discontinue operation of the motor.

14. The door lock assembly of claim 1, wherein the first end portion of the clutch driver unit comprises a fork element that rides in a grooved portion of the clutch driven plate.

15. A door lock assembly, comprising:

a knob configured to allow a user to lock or unlock a door;

a clutch driving plate rotationally secured to the knob;

a tailpiece configured to rotate about a longitudinal axis, wherein rotation of the tailpiece is configured to retract or extend a latch;

a clutch driven plate rotationally secured to the tailpiece; and an actuator comprising:

a motor including an output shaft extending along a first axis parallel to the longitudinal axis; and a clutch driver unit including an axially extending portion disposed between the first axis and the longitudinal axis, the axially extending portion extending between a first laterally extending end portion axially secured to the clutch driven plate and a second laterally extending end portion aligned with the first axis and operatively connected with the motor for motor driven axial movement of the clutch driver unit and the clutch driven plate between an unlocked configuration in which the clutch driven plate is coupled with the clutch driving plate for co-rotation of the knob and the tailpiece and a locked configuration in which the clutch driven plate is uncoupled from the clutch driving plate to prevent co-rotation of the knob and the tailpiece.

16. The door lock assembly of claim 15, further comprising a first helical element mounted to the output shaft for motor driven rotation of the first helical element, wherein the clutch driver unit includes a second helical element disposed on the second end portion, the second helical element being threadably engageable with the first helical element for motor driven axial movement of the clutch driver unit and the clutch driven plate between the unlocked configuration and the locked configuration.

17. The door lock assembly of claim 16, wherein the first helical element comprises a worm gear.

18. The door lock assembly of claim 16, wherein the second helical element comprises a helical spring.

19. The door lock assembly of claim 15, further comprising a stop switch connected with the motor, wherein when the clutch driver unit is moved to the locked configuration, the clutch driver unit engages the stop switch to discontinue operation of the motor.

20. The door lock of claim 15, wherein the first end portion of the clutch driver unit comprises a fork element that rides in a grooved portion of the clutch driven plate.

* * * * *